(12) United States Patent
Li et al.

(10) Patent No.: US 10,843,366 B2
(45) Date of Patent: Nov. 24, 2020

(54) SPLITTING METHOD FOR A LIQUID CRYSTAL DISPLAY (LCD)

(71) Applicant: SHENZHEN CHINA STAR OPTOELECTRONICS TECHNOLOGY CO., LTD., Shenzhen (CN)

(72) Inventors: Dong Li, Shenzhen (CN); Hang Yang, Shenzhen (CN); Haibo Huang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 16 days.

(21) Appl. No.: 15/297,391

(22) Filed: Oct. 19, 2016

(65) Prior Publication Data

US 2017/0036369 A1 Feb. 9, 2017

Related U.S. Application Data

(63) Continuation of application No. 13/381,001, filed as application No. PCT/CN2011/083449 on Dec. 5, 2011, now abandoned.

(30) Foreign Application Priority Data

Nov. 28, 2011 (CN) .......................... 2011 1 0384820

(51) Int. Cl.
*B26F 3/00* (2006.01)
*B26D 3/08* (2006.01)
*B26D 5/00* (2006.01)
*G02F 1/13* (2006.01)
*G02F 1/1333* (2006.01)

(52) U.S. Cl.
CPC ............... *B26F 3/002* (2013.01); *B26D 3/08* (2013.01); *G02F 1/1303* (2013.01);
(Continued)

(58) Field of Classification Search
CPC . B26D 3/08; B26D 3/085; B26F 3/002; B26F 3/02; B28D 5/005; B28D 5/0011;
(Continued)

(56) References Cited

U.S. PATENT DOCUMENTS 3,562,803 A 2/1971 Townsend
4,175,684 A 11/1979 Butler
(Continued)

FOREIGN PATENT DOCUMENTS

CN 1496798 5/2004
CN 101362627 2/2009
(Continued)

*Primary Examiner* — Clark F Dexter
(74) *Attorney, Agent, or Firm* — Kirton McConkie; Evan R. Witt

(57) ABSTRACT

A splitting apparatus for an LCD panel and a splitting method thereof are described. The LCD panel has a first substrate and a second substrate. The splitting apparatus includes a first splitting device and a second splitting device disposed correspondingly to the first splitting device, and the second splitting device includes protrusion adjustment devices. The protrusion adjustment device extrudes the second substrate for forming a protrusion corresponding to a split line to separate a split plate from the first substrate by a deformation portion of the protrusion and to remove the split plate by the first splitting device. The splitting apparatus makes a rapid separation of the split plate.

4 Claims, 4 Drawing Sheets

(52) U.S. Cl.
CPC ...... *G02F 1/1333* (2013.01); *G02F 1/133351* (2013.01); *Y10T 225/12* (2015.04); *Y10T 225/329* (2015.04); *Y10T 225/371* (2015.04)

(58) Field of Classification Search
CPC .. B28D 5/0023; B28D 5/0052; B28D 5/0005; C03B 33/03; C03B 33/033; C03B 33/07; G02F 1/1303; G02F 1/13351
USPC .................. 225/1, 2, 96, 96.5, 97, 103, 104
See application file for complete search history.

(56) References Cited

U.S. PATENT DOCUMENTS 4,940,176 A  7/1990  Sato et al.
8,113,401 B2  2/2012  Choo et al.
2003/0205604 A1  11/2003  Matsuzawa
2003/0209847 A1*  11/2003  Allison et al. .... H01L 21/67132
                                                                    269/21
2004/0155085 A1  8/2004  Takamatsu et al.
2010/0248450 A1  9/2010  Saeki

FOREIGN PATENT DOCUMENTS

| CN | 101770105 | 7/2010 |
| CN | 102190435 | 9/2011 |
| JP | 2000044266 | 2/2000 |
| JP | 2004026539 | 1/2004 |
| JP | 2006199553 | 8/2006 |
| TW | 458860 | 11/2001 |

* cited by examiner

SPLITTING METHOD FOR A LIQUID CRYSTAL DISPLAY (LCD)

CROSS-REFERENCES TO RELATED APPLICATION

This is a continuation application of U.S. application Ser. No. 13/381,001, filed on Dec. 27, 2011 and entitled "SPLITTING APPARATUS OF LIQUID CRYSTAL DISPLAY (LCD) AND SPLITTING METHOD THEREOF", now abandoned.

FIELD OF THE INVENTION

The present invention relates to a manufacturing technology of liquid crystal display (LCD), and more particularly to a splitting apparatus for an LCD panel and splitting method thereof.

BACKGROUND OF THE INVENTION

With the wide use of the LCD panel, it is necessary to meet the higher manufacturing efficiency requirement of the LCD panel.

During the production process of the LCD panel, there is a need to expose the metal wire disposed on two side edges of the thin film transistor (TFT) array substrate by splitting the two sides of the color filter (CF) substrate after the TFT array substrate is assembled with the CF substrate.

Please refer to FIG. 1A, FIG. 1B and FIG. 1C. FIGS. 1A-1C are schematic views of a conventional cracking device for splitting the LCD panel 20'. The cracking device includes a top cracking portion 11', a bottom cracking portion 12' and an incision head 13'. The LCD panel 20' includes a CF substrate 21' and a TFT substrate 22'.

As shown in FIG. 1A, when performing a cracking process on the CF substrate 21', the top cracking portion 11' presses close to the TFT substrate 22' for holding the LCD panel 20' and the incision head 13' is disposed under the CF substrate 21' for scribing a crack line on the CF substrate 21' to form a cracked plate 211'.

As shown in FIG. 1B, the incision head 13' is removed and withdrawn after scribing the crack line to form the cracked plate 211'. The bottom cracking portion 12' is moved to the cracked plate 211' and presses the cracked plate 211', so that the bottom cracking portion 12' and the top cracking portion 11' clamp and bend one side of the LCD panel 20' with the cracked plate 211' along the direction B to separate the cracked plate 211' from the CF substrate 21'.

As shown in FIG. 1C, after the cracked plate 211' separates from the CF substrate 21', the bottom cracking portion 12' adheres the cracked plate 211' and removes the cracked plate 211'.

According to the above-mentioned manners, the bottom cracking portion 12' and the top cracking portion 11' have to clamp the LCD panel 20' and make a bending operation along the direction B in FIG. 1B for separating the cracked plate 211' from CF substrate 21'. Thus, the cracked plate 211' cannot be quickly formed in this manner which disadvantageously increases the manufacturing duration and the exposed metal wire on the TFT substrate tends to be scratched by the cracked plate 211'.

Consequently, there is a need to develop a novel manufacturing technology to solve the aforementioned problems of slow separation of the cracked plate 211' from the CF substrate and the scratched metal wire on the TFT substrate during the cracking process.

SUMMARY OF THE INVENTION

One objective of the present invention is to provide a splitting apparatus for an LCD panel and a splitting method thereof for rapidly and efficiently separating the split plate from the CF substrate to avoid scratching the metal wire exposed in the TFT substrate during the separation of the split plate.

According to the above objective, the present invention sets forth a splitting apparatus for an LCD panel. The splitting apparatus includes a first splitting device and a second splitting device disposed correspondingly to the first splitting device, and the second splitting device includes at least one protrusion adjustment device capable of extending and retracting.

In the splitting apparatus for the LCD panel of the present invention, the protrusion adjustment device includes a protrusion supporting shaft, a primary division portion connected to the protrusion supporting shaft, a screw division portion connected to the primary division portion, a coarse adjustment knob connected to the screw division portion, and a fine adjustment knob connected to the coarse adjustment knob. The coarse adjustment knob and the fine adjustment knob control the protrusion supporting shaft to either extend or retract, and the primary division portion and the screw division portion display an extending length and a retracting length of the protrusion supporting shaft.

In the splitting apparatus for the LCD panel of the present invention, the splitting apparatus further includes a base unit. The first splitting device has a first retaining member and the second splitting device has a second retaining member that are disposed at two end portions of the base unit respectively. The first splitting device further includes a first extensible controller for controlling a movement operation of the first retaining member along a horizontal direction, and a lifting and lowering controller for controlling the lifting and lowering operations of the first retaining member and the first extensible controller along a vertical direction. The second splitting device further includes a second extensible controller for controlling a movement operation of the second retaining member along the horizontal direction, and the second extensible controller is connected to the second retaining member.

In the splitting apparatus for the LCD panel of the present invention, an adhering layer is formed on a surface of the first retaining member.

In the splitting apparatus for the LCD panel of the present invention, the material of the adhering layer is polyaniline.

In the splitting apparatus for the LCD panel of the present invention, the splitting apparatus further includes a plurality of protrusion adjustment devices, and the second splitting device further includes the second retaining member, and the protrusion adjustment devices are arranged at the second retaining member at a uniform interval.

Another objective of the present invention is to provide a splitting apparatus for splitting an LCD panel. The LCD panel has a first substrate and a second substrate assembled correspondingly with the first substrate, a cutting device cuts the first substrate to form a split line and a split plate. The splitting apparatus includes a first splitting device and a second splitting device disposed correspondingly to the first splitting device. The second splitting device includes at least one protrusion adjustment device for extruding the second substrate to form a protrusion corresponding to the split line, the split plate separates from the first substrate by a deformation portion of the protrusion along the split line, and the split plate is removed by the first splitting device.

In the splitting apparatus of the present invention, the first splitting device further includes a first retaining member for pressing the split plate when the protrusion adjustment device extrudes the second substrate.

In the splitting apparatus of the present invention, an adhering layer is formed on a surface of the first retaining member.

In the splitting apparatus of the present invention, the material of the adhering layer is polyaniline.

In the splitting apparatus of the present invention, the protrusion adjustment device includes a protrusion supporting shaft, a primary division portion connected to the protrusion supporting shaft, a screw division portion connected to the primary division portion, a coarse adjustment knob connected to the screw division portion, and a fine adjustment knob connected to the coarse adjustment knob. The coarse adjustment knob and fine adjustment knob control the protrusion supporting shaft to either extend or retract, and the primary division portion and the screw division portion display an extending length and a retracting length of the protrusion supporting shaft.

In the splitting apparatus of the present invention, the splitting apparatus further includes a plurality of protrusion adjustment devices, and the second splitting device further includes a second retaining member, and the protrusion adjustment devices are arranged at the second retaining member at a uniform interval.

In the splitting apparatus of the present invention, the splitting apparatus further includes a base unit. The first splitting device and the second splitting device are disposed at two end portions of the base unit respectively. The first splitting device further includes a first extensible controller for controlling a movement operation of the first retaining member along a horizontal direction, and a lifting and lowering controller for controlling the lifting and lowering operations of the first retaining member and the first extensible controller along a vertical direction. The second splitting device further includes a second extensible controller for controlling the movement operation of the second retaining member along the horizontal direction. The second extensible controller is connected to the second retaining member Another objective of the present invention is to provide a splitting method, the splitting method of a LCD panel having a first substrate and a second substrate includes the steps of:

(A) providing a splitting apparatus, wherein the splitting apparatus comprises a first splitting device and a second splitting device disposed correspondingly to the first splitting device, and the second splitting device further comprises at least one protrusion adjustment device;

(B) extruding the second substrate by the protrusion adjustment device for forming a protrusion corresponding to a split line of the first substrate and separating a split plate from the first substrate by a deformation portion of the protrusion along the split line; and (C) adhering the split plate to remove the split plate by the first splitting device.

In the splitting method of the present invention, the first splitting device further comprises a first retaining member and during the step (B), the first retaining member presses the split plate when the protrusion adjustment device extrudes the second substrate.

In the splitting method of the present invention, an adhering layer is formed on a surface of the first retaining member.

In the splitting method of the present invention, during the step of adhering the split plate to remove the split plate by the first splitting device, further comprising a step of adhering the split plate to remove the split plate by the adhering layer on the first splitting device.

In the splitting method of the present invention, the material of the adhering layer is polyaniline.

In the splitting method of the present invention, the protrusion adjustment device includes a protrusion supporting shaft, a primary division portion connected to the protrusion supporting shaft, a screw division portion connected to the primary division portion, a coarse adjustment knob connected to the screw division portion, and a fine adjustment knob connected to the coarse adjustment knob. During the step of extruding the second substrate by the protrusion adjustment device, further includes the steps of:

controlling the protrusion supporting shaft to extend by the coarse adjustment knob and the fine adjustment knob; and displaying an extending length of the protrusion supporting shaft by the primary division portion and the screw division portion.

In the splitting method of the present invention, the splitting method further comprises a plurality of protrusion adjustment devices, the second splitting device further comprises a second retaining member, and the protrusion adjustment devices are arranged at the second retaining member at a uniform interval.

In the splitting method of the present invention, the splitting apparatus further includes a base unit, the first splitting device and the second splitting device are disposed at two end portions of the base unit respectively, and the first splitting device comprises a first extensible controller and a lifting and lowering controller. During the step of adhering the split plate to remove the split plate by the first splitting device, further includes a step of controlling a movement operation of the first retaining member along a horizontal direction by the first extensible controller, and controlling a lowering operation of the first retaining member and the first extensible controller along a vertical direction by the lifting and lowering controller.

In comparison to the prior art, the second splitting device of the present invention has the protrusion adjustment device for extruding the second substrate for forming a protrusion corresponding to the split line of the first substrate and separating the split plate from the first substrate by a deformation portion of the protrusion. Therefore, the splitting apparatus for the LCD panel and the splitting method thereof rapidly and efficiently separate the split plate from the first substrate to avoid scratching the metal wire exposed in the second substrate during the separation of the split plate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
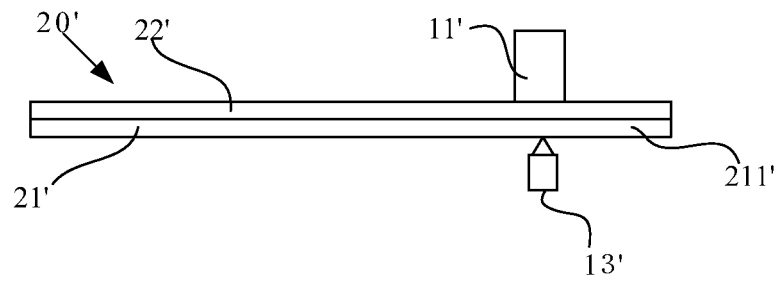
FIGS. 1A-1C are schematic views of a conventional cracking device for splitting the LCD panel.
Figure 1B:
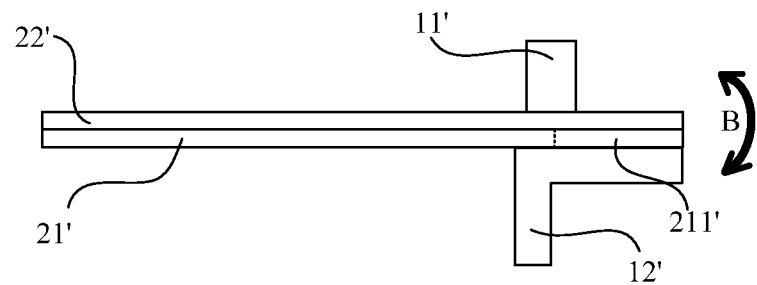
Figure 1C:
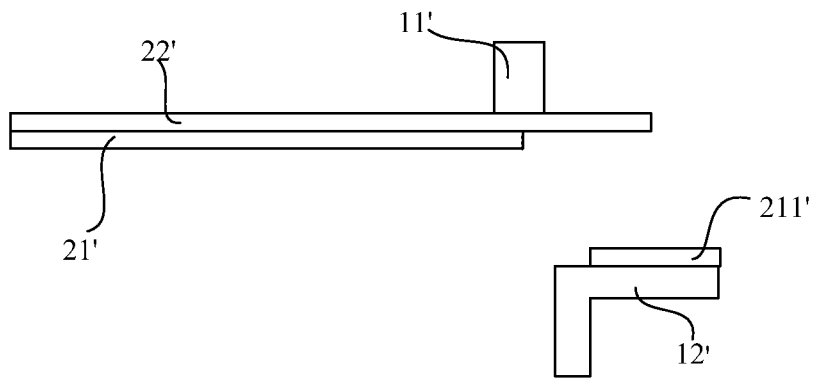
Figure 2:
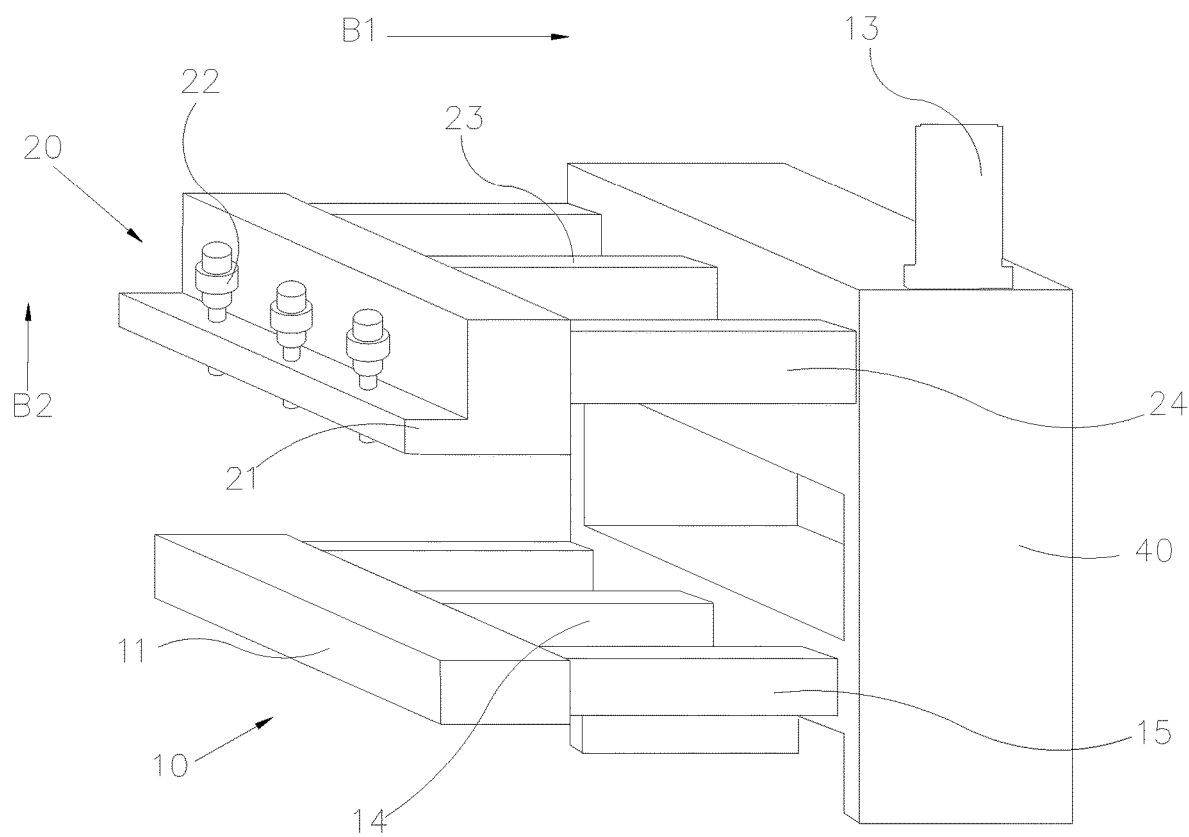
FIG. 2 is a schematic structural view of a splitting apparatus for an LCD panel according to one preferred embodiment of the present invention.

FIG. 2 is a schematic structural view of a splitting apparatus for the LCD panel according to one preferred embodiment of the present invention. The splitting apparatus for the LCD panel includes a first splitting device 10, a second splitting device 20 and a base unit 40. The first splitting device 10 and the second splitting device 20 are disposed at two end portions, i.e. upper portion and lower portion, respectively of base unit 40.

The first splitting device 10 further includes a first retaining member 11, a lifting and lowering controller 13, a first extensible controller 14 and a first extensible guide rail 15. The lifting and lowering controller 13 is disposed on the base unit 40. The first extensible controller 14 and first extensible guide rail 15 are connected to the first retaining member 11. The lifting and lowering controller 13 is connected to the first extensible controller 14 within the base unit 40 for controlling the lifting and lowering operations of the first retaining member 11, the first extensible controller 14 and the first extensible guide rail 15 along the vertical direction B2. The first extensible controller 14 controls the movement operation of the first retaining member 11 on the first extensible guide rail 15 along the horizontal direction B1.

The second splitting device 20 further includes a second retaining member 21, a plurality of protrusion adjustment devices 22, a second extensible controller 23 and a second extensible guide rail 24. The second extensible controller 23 controls the movement operation of the second retaining member 21 on the second extensible guide rail 24 along the horizontal direction B1.

Figure 3:
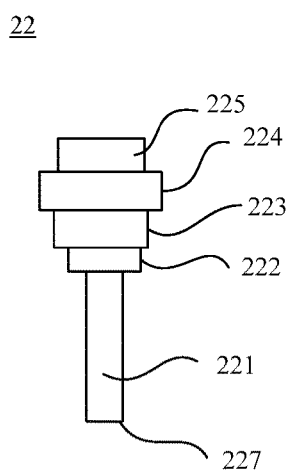
FIG. 3 is a schematic structural view of a protrusion adjustment device according to one embodiment of the present invention.

Please refer to FIG. 2 and FIG. 3. FIG. 2 is a schematic structural view of the splitting apparatus for the LCD panel according to one preferred embodiment of the present invention. FIG. 3 is a schematic structural view of the protrusion adjustment device 22 according to one embodiment of the present invention. As shown in FIG. 2, for example, three protrusion adjustment devices 22, but not limited thereto, are arranged in the second retaining member 21 of the second splitting device 20 at a uniform interval or a predetermined distance.

The protrusion adjustment device 22 includes a protrusion supporting shaft 221, a primary division portion 222, a screw division portion 223, a coarse adjustment knob 224 and a fine adjustment knob 225. The protrusion supporting shaft 221 has a tip 227 at an end thereof. The coarse adjustment knob 224 and fine adjustment knob 225 are connected to the primary division portion 222, screw division portion 223 and protrusion supporting shaft 221. The coarse adjustment knob 224 and fine adjustment knob 225 control the protrusion supporting shaft 221 to either extend or retract at a predetermined length. The primary division portion 222 and screw division portion 223 control the coarse adjustment knob 224 and fine adjustment knob 225 to adjust and display the extending length and retracting length of the protrusion supporting shaft 221.

In one embodiment, the second retaining member 21 has a guide track (not shown) disposed in a connecting position between the second retaining member 21 and each protrusion adjustment device 22. The protrusion supporting shaft 221 extends or retracts along the guide track.

Figure 4A:
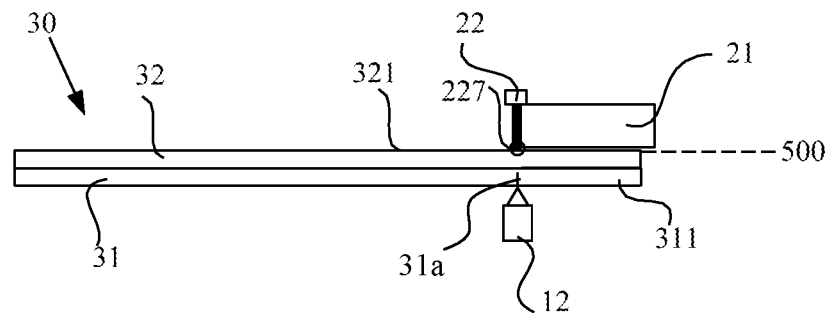
FIGS. 4A-4C are schematic views of the splitting process of the splitting apparatus used on an LCD panel according to one embodiment of the present invention.
Figure 4B:
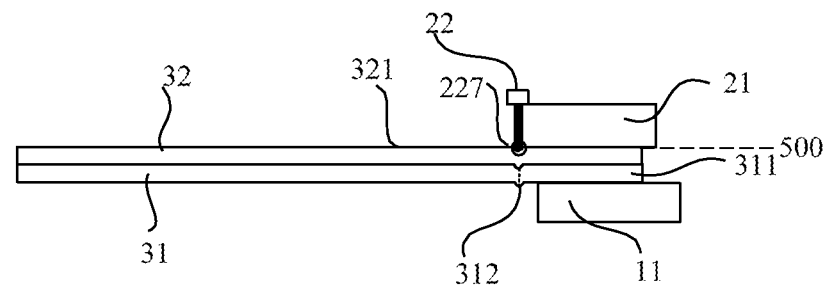
Figure 4C:
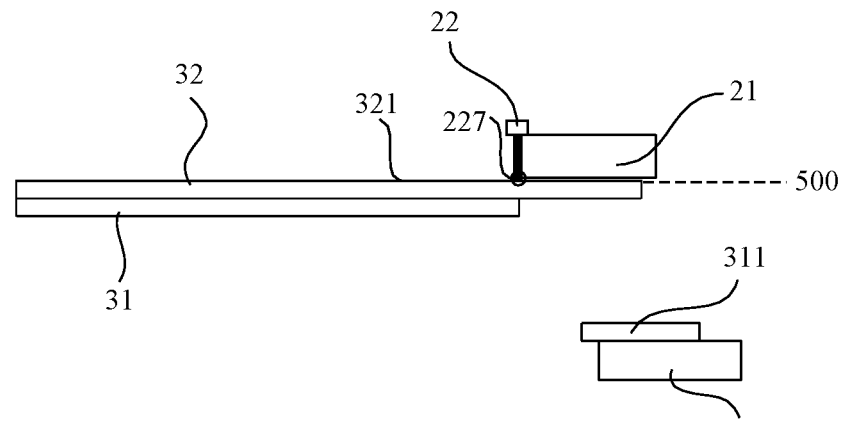

FIGS. 4A-4C are schematic views of a splitting process of the splitting apparatus of the LCD panel 30 according to one embodiment of the present invention. The LCD panel 30 includes a first substrate 31, which is a CF substrate, and a second substrate 32, which is a TFT substrate, assembled correspondingly with the first substrate 31, and the second substrate 32 has a first surface 321 which faces the second retaining member 21 and the protrusion adjustment device 22. The first surface 321 of the second substrate 32 is at the same level of a plane 500. The first retaining member 11 corresponds to the first substrate 31 and the second retaining member 21 and protrusion adjustment device 22 are disposed above the first substrate 31, and the tip 227 of the protrusion adjustment device 22 faces the first surface 321 of the second substrate 32.

Please refer to FIG. 2, FIG. 3 and FIG. 4A. An incision head 12 is disposed under the first substrate 31. The second extensible controller 23 controls the second retaining member 21 to move towards the LCD panel 30 along the second extensible guide rail 24 and the second retaining member 21 contacts the second substrate 32 of the LCD panel 30. The incision head 12 is used to cut the first substrate 31 for scribing a splitting line 31a to form the split plate 311. When the incision head 12 performs the cutting operation on the first substrate 31, the second retaining member 21 presses on the second substrate 32 to hold the LCD panel 30. An end of the protrusion supporting shaft 221 of the protrusion adjustment device 22 either is in a same plane with a surface of the second retaining member 21 contacting the first surface 321 of the second substrate 32 to be in a contact status, or is disposed above the surface of second substrate 32 to be in a non-contact status.

Please refer to FIG. 2, FIG. 3 and FIG. 4B. The incision head 12 is removed and withdrawn after forming the split plate 311. The lifting and lowering controller 13 and the first extensible controller 14 control the first retaining member 11 to be moved to the split plate 311 so that the first retaining member 11 attaches to the split plate 311. The first retaining member 11 and the second retaining member 21 each clamp one side of the LCD panel 30, respectively. Meanwhile, the protrusion adjustment device 22 aligns to the split line 31a of the first substrate 31, and the coarse adjustment knob 224 and fine adjustment knob 225 of the protrusion adjustment device 22 are adjusted to allow the protrusion supporting shaft 221 and the tip 227 of the protrusion supporting shaft 221 facing the first surface 321 to be controlled by the at least one adjustment knob 224, 225 to extend with the tip 227 passing through a plane 500 where the first surface 321 of the second substrate 32 is located, to thereby extrude the second substrate 32 for forming a protrusion 312 corresponding to the split line. Thus, the split plate 311 separates from the first substrate 31 by a deformation portion of the protrusion 312 along the split line.

Please refer to FIG. 2, FIG. 3 and FIG. 4C. The second extensible controller 23 controls the second retaining member 21 to be removed after the split plate 311 separates from the first substrate 31. In one embodiment, an adhering layer 115, e.g. the material of polyaniline, is formed on a surface of the first retaining member 11. The adhering layer 115 formed on the surface of the first retaining member 11 of the first splitting device 10 adheres the split plate 311 to remove the split plate 311 by the first splitting device 10. The lifting and lowering controller 13 and the first extensible controller 14 control the first retaining member 11 to remove the split plate 311.

By using the above-mentioned manners, the splitting apparatus for the LCD panel in the present invention can rapidly and efficiently separate the split plate 311 from the first substrate 31 and remove the split plate 311 to make a quick separation of the split plate 311. Further, the splitting apparatus for the LCD panel in the present invention avoids scratching the metal wire exposed on the second substrate 32 during the separation of the split plate 311.

Figure 5:
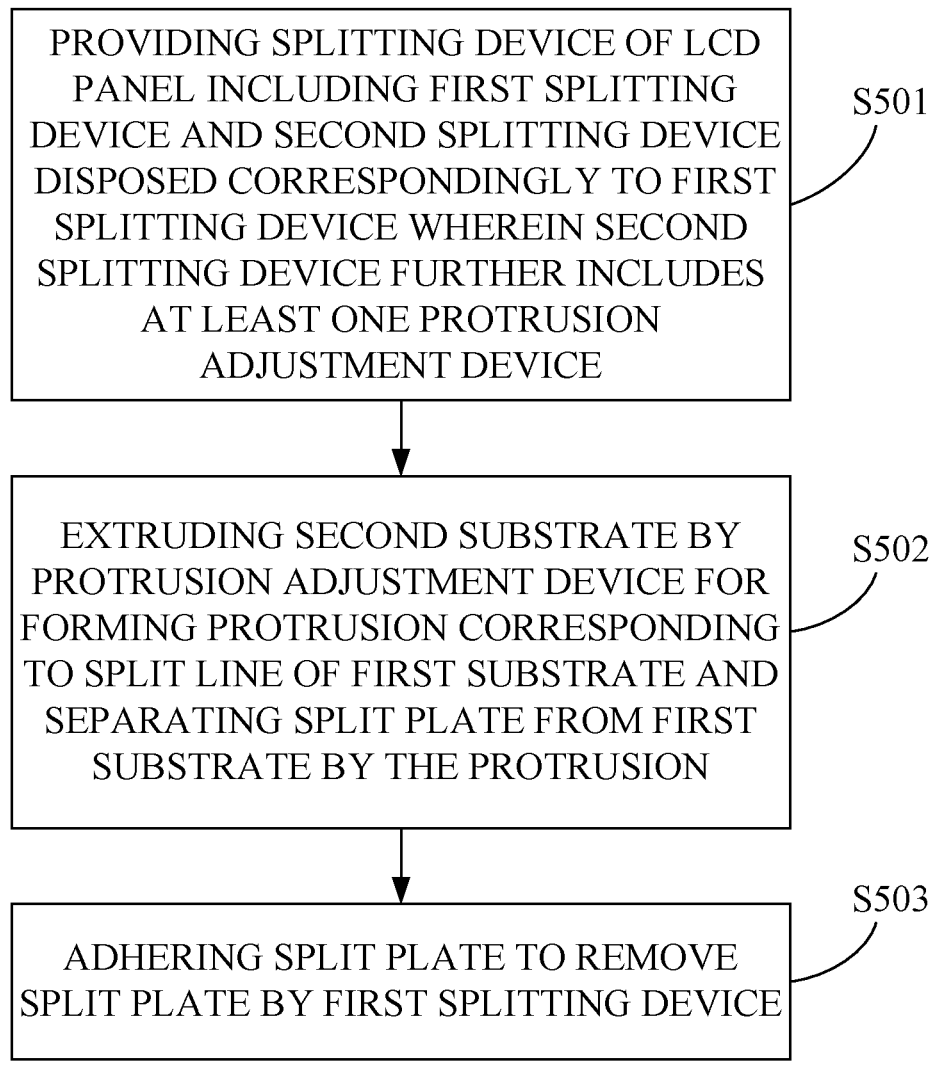
FIG. 5 is a flow chart of splitting method according to one embodiment of the present invention.

FIG. 5 is a flow chart of a splitting method used for the LCD panel according to one embodiment of the present invention.

In step S501, a splitting device for an LCD panel is provided. The splitting device for the LCD panel includes a first splitting device 10 and a second splitting device 20 disposed correspondingly to the first splitting device 10, and the second splitting device 20 further includes protrusion adjustment devices 22. The structure of the splitting device for the LCD panel is depicted in FIG. 2 and FIG. 3 and the detailed descriptions are omitted herein.

In step S502, the protrusion supporting shaft 221 extrudes the second substrate 32 for forming a protrusion 312 corresponding to the split line 31a of the first substrate 31. Thus, the split plate 311 separates from the first substrate 31 by a deformation portion of the protrusion 312 along the split line.

In step S503, the first splitting device 10 adheres to the split plate 311 to remove the split plate 311.

According to the above-mentioned descriptions, the splitting apparatus for the LCD panel in the present invention can rapidly and efficiently separate the split plate 311 from the first substrate 31 and remove the split plate 311 to make a quick separation of the split plate. Further, the splitting apparatus for the LCD panel avoids scratching the metal wire exposed on the second substrate during the separation of the split plate.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A splitting method of an LCD panel having a first substrate and a second substrate, wherein the splitting method comprises the steps of:
    (A) providing an incision head and using the incision head to cut and scribe a split line in the first substrate;
    (B) providing a splitting apparatus, wherein the splitting apparatus comprises a first splitting device and a second splitting device disposed opposite to the first splitting device, and the second splitting device comprises at least one protrusion adjustment device;
    (C) splitting the first substrate at and along the split line into a split plate and a retained portion by extruding the second substrate using the at least one protrusion adjustment device to form a respective at least one extrusion in the second substrate, each extrusion extending from the second substrate and forming a protrusion in the first substrate at the split line of the first substrate, wherein the first substrate is split at and along the split line by the protrusion to separate the split plate from the retained portion, the protrusion is a portion of the first substrate that protrudes from the split line further than rest of the first substrate; and
    (D) removing the split plate using the first splitting device;
    wherein the first splitting device comprises a first retaining member and the second splitting device comprises a second retaining member, and
    during the step (C), the first retaining member and the second retaining member clamp the LCD panel therebetween such that forming the extrusion in the second substrate causes the extrusion to extend from the second substrate and into the first substrate to form the protrusion in the first substrate,
    wherein during step (C), a projection of the first retaining member on the first substrate does not overlap the split line; and
    wherein the first substrate is a color filter substrate, and the second substrate is a thin film transistor array substrate.

2. The splitting method of claim 1, wherein an adhering layer is formed on a surface of the first retaining member; and
    the step (D) comprises adhering the split plate to the adhering layer formed on the surface of the first retaining member to remove the split plate using the first splitting device.

3. The splitting method of claim 2, wherein the material of the adhering layer is polyaniline.

4. The splitting method of claim 3, wherein each of the at least one protrusion adjustment device comprises a protrusion supporting shaft, a primary division portion connected to the protrusion supporting shaft, a screw division portion connected to the primary division portion, a coarse adjustment knob connected to the screw division portion, and a fine adjustment knob connected to the coarse adjustment knob; and
    during the step of extruding the second substrate by the at least one protrusion adjustment device, further comprising the steps of:
    controlling the protrusion supporting shaft to extend by the coarse adjustment knob and fine adjustment knob; and
    displaying an extending length of the protrusion supporting shaft by the primary division portion and the screw division portion.

* * * * *